(12) United States Patent
Has et al.

(10) Patent No.: US 12,495,924 B2
(45) Date of Patent: Dec. 16, 2025

(54) DOMESTIC PEF COOKING DEVICE

(71) Applicant: BSH Hausgeräte GmbH, Munich (DE)

(72) Inventors: Uwe Has, Unterneukirchen (DE);
Barbara Heikel, Traunstein (DE);
Arnulf Himmel, Traunreut (DE);
Bernhard Koch, Inzell (DE); Manfred Steinbacher, Inzell (DE); Edith Wrehde, Nußdorf (DE)

(73) Assignee: BSH Hausgeräte GmbH, Munich (DE)

( * ) Notice: Subject to any disclaimer, the term of this patent is extended or adjusted under 35 U.S.C. 154(b) by 756 days.

(21) Appl. No.: 17/796,279

(22) PCT Filed: Mar. 3, 2021

(86) PCT No.: PCT/EP2021/055289
§ 371 (c)(1),
(2) Date: Jul. 29, 2022

(87) PCT Pub. No.: WO2021/185580
PCT Pub. Date: Sep. 23, 2021

(65) Prior Publication Data
US 2023/0082441 A1  Mar. 16, 2023

(30) Foreign Application Priority Data

Mar. 19, 2020 (DE) .......................... 102020203520.2

(51) Int. Cl.
*A47J 27/00* (2006.01)
*A23L 5/10* (2016.01)
(Continued)

(52) U.S. Cl.
CPC .............. *A47J 27/004* (2013.01); *A23L 5/15* (2016.08); *A47J 36/32* (2013.01); *H05B 6/54* (2013.01); *H05B 6/62* (2013.01)

(58) Field of Classification Search
CPC .......... A47J 27/00; A47J 27/004; A47J 36/32; H05B 6/54; H05B 6/62
(Continued)

(56) References Cited

U.S. PATENT DOCUMENTS

| 2014/0057025 | A1* | 2/2014 | Van Oord | H05B 6/62 |
| | | | | 426/244 |
| 2016/0167156 | A1* | 6/2016 | Burke | B23K 11/0013 |
| | | | | 219/76.12 |

(Continued)

FOREIGN PATENT DOCUMENTS

| EP | 0772991 A1 | 5/1997 |
| EP | 1669677 A1 | 6/2006 |
| EP | 3503678 A1 | 6/2019 |

OTHER PUBLICATIONS

International Search Report PCT/EP2021/055289 dated Jan. 27, 2021.

*Primary Examiner* — Phuong T Nguyen
(74) *Attorney, Agent, or Firm* — Michael E. Tschupp; Andre Pallapies; Brandon G. Braun

(57) ABSTRACT

A household PEF cooking device includes a cooking product container which can be filled with liquid and includes PEF electrodes which lie opposite one another and between which a cooking product can be introduced. A PEF signal generator applies PEF signals to the PEF electrodes, and a control device control the PEF signal generator. An IR sensor which measures contactlessly is disposed at a distance from the PEF electrodes and connected to the control device. A measuring dot of the IR sensor encompasses an outer face of an electrically conductive region of a wall of the cooking product container, which electrically conductive region can be contacted on an inner face by the liquid when the cooking product container is full.

20 Claims, 2 Drawing Sheets

(51) Int. Cl.
*A47J 36/32* (2006.01)
*H05B 6/54* (2006.01)
*H05B 6/62* (2006.01)

(58) Field of Classification Search
USPC .............................. 219/436; 99/358; 426/244
See application file for complete search history.

(56) References Cited

U.S. PATENT DOCUMENTS

2016/0205972 A1   7/2016   Van Oord
2022/0053614 A1   2/2022   Becke

* cited by examiner

DOMESTIC PEF COOKING DEVICE

CROSS-REFERENCES TO RELATED APPLICATIONS

This application is the U.S. National Stage of International Application No. PCT/EP2021/055289, filed Mar. 3, 2021, which designated the United States and has been published as International Publication No. WO 2021/185580 A1 and which claims the priority of German Patent Application, Serial No. 10 2020 203 520.2, filed Mar. 19, 2020, pursuant to 35 U.S.C. 119 (a)-(d).

The contents of International Application No. PCT/EP2021/055289 and German Patent Application, Serial No. 10 2020 203 520.2 are incorporated herein by reference in their entireties as if fully set forth herein.

BACKGROUND OF THE INVENTION

The invention relates to a household PEF cooking device, having a cooking product container which can be filled with liquid and with PEF electrodes lying opposite one another, between which a cooking product can be introduced, a PEF signal generator for applying PEF signals to the PEF electrodes and a control device for controlling the PEF signal generator.

PEF ("Pulsed Electric Field") cooking, i.e. the cooking of a cooking product or food by means of pulsed voltage pulses ("PEF pulses") is known in principle. In this case, the PEF pulses are applied to flat PEF electrodes of a cooking product container which, as a result of the contact of the PEF electrodes with the contents of the cooking product container, generate an electric current through the contents of the cooking product container. The contents typically comprise liquid cooking product, such as soup or a cooking product which has been placed into a water bath. The generated current also flows through the cooking product, whereby it is cooked.

For example, WO 2016/008868 A1 relates to a method for PEF ("Pulsed Electric Field") cooking of a food product in a treatment chamber, wherein the treatment chamber comprises two opposing walls which in each case form an electrode. The method comprises the following steps: (a) placing a quantity of the food product, optionally in a surrounding liquid, in the treatment chamber between the two electrodes so that the food product and/or the surrounding liquid are in direct contact with the electrodes; and (b) applying electrical impulses, which are generated by a pulsed electrical field generator, onto the electrodes, so that the food product is subjected to a pulsed electrical field having a field strength of 10 to 180 V/cm and the total cooking time is 0.5 to 1000 s. Preferably, the number of pulses is 1 to 2000000 and the pulses have in each case a duration of 1 to 20000 microseconds. The food product and, if present, the surrounding liquid have an electric conductivity of 0.01 to 10 S/m. WO 2016/008868 A1 also relates to a cooking system which is suitable for cooking a food product according to such a method.

In PEF cooking, as in other cooking methods, it is advantageous if a progress of the cooking is able to be monitored, for example in order to adapt operating parameters during the PEF cooking (for example in order to adapt a type and an extent of the energy supply, for example by varying a duration and/or frequency of the PEF pulses) in order to determine particularly accurately when the end of the cooking occurs and/or when unplanned developments occur, in order to intervene in the cooking process so as to take corrective action. To this end, sensors are frequently used. When using sensors which are arranged on a removable cooking product container, the problem occurs that the high voltage provided by the voltage pulses (which may be several hundred volts) must not be carried into the (remaining) PEF cooking device via the sensors.

BRIEF SUMMARY OF THE INVENTION

It is the object of the present invention to overcome at least partially the drawbacks of the prior art and, in particular, to provide a possibility of operating sensors arranged on a cooking product container in an operationally reliable and user-friendly manner.

This object is achieved according to the features of the independent claims. Advantageous embodiments form the subject of the dependent claims, the description and the drawings.

The object is achieved by a household PEF cooking device having
- a cooking product container which can be filled with liquid and comprises PEF electrodes lying opposite one another, between which a cooking product can be introduced,
- a PEF signal generator for applying PEF signals to the PEF electrodes,
- a control device for controlling the PEF signal generator and
- at least one IR sensor that measures contactlessly is provided at a distance from the PEF electrodes and is connected to the control device, wherein
- a measuring dot of the IR sensor encompasses an outer face of an electrically conductive region of a wall of the cooking product container, which region can be contacted on its inner face by the liquid when the cooking product container is full.

This results in the advantage that a temperature of the liquid located in the cooking product container may be measured in a contactless manner with low temporal latency and high accuracy, by means of the sensor signals output by the at least one IR sensor. This makes use of the fact that electrically conductive material also has a very high thermal conductivity and thereby the temperature, which is applied to the inner face of the wall region located in the measuring dot of the IR sensor, is applied to the outer face of the wall region with only a slight offset and short time delay.

As a result, advantageously the energy supply which is input by means of the control device into the cooking product container via the PEF signals may also be modified during the process, on the basis of the sensor signals, for example for controlling the temperature of the liquid.

A further advantage is that due to the contactless measurement a flash-over of the high voltage applied to the PEF electrodes onto the IR sensor and also onto components galvanically connected to the IR sensor is reliably avoided.

The household PEF cooking device serves in a manner known in principle to cook or to heat cooking product located between the PEF electrodes by a flow of current.

The PEF electrodes are electrically conductive, typically metal, and directly contact the liquid or the cooking product. The PEF electrodes may be configured to be plate-shaped ("contact plates"). The PEF electrodes are oriented, in particular, parallel to one another. They may be oriented, for example, vertically.

The opposing PEF electrodes are electrically insulated from one another and form a capacitor. The PEF signals applied thereto are, in particular, pulsed high-voltage signals. Specifically, the PEF signals may be (a) pulsed AC voltage signal(s).

The liquid may be, for example, water or a water-based liquid (for example soup).

By means of the control device it is possible to vary the PEF signals, for example relative to the frequency thereof, and thus also an energy input into the liquid and the cooking product.

As the at least one IR sensor is connected to the control device, the control device may use the detected temperature as an input variable, for example for varying the PEF signals (for example for controlling a temperature) and/or for monitoring a situation. Thus, on the basis of the received temperature signals or the temperature data derived therefrom, the control device may be designed to identify whether there is any liquid in the cooking product container. This may be implemented, in particular during an initial heating-up phase, by monitoring whether the detected temperature increases sufficiently within a predetermined time period (for example a temperature difference within the predetermined time period is greater than a predetermined threshold value). If this is not the case, it is possible to draw the conclusion that a level is too low. The control device may then initiate at least one action, for example stop the cooking process and/or output an instruction to a user.

A measuring dot may be understood to mean, in particular, the region on the outer face of the wall which is inside the field of view of an IR sensor. When the cooking product container is filled at least up to a minimum level, at least one measuring dot of at least one IR sensor should be located entirely below the height of the liquid in the cooking product container.

One embodiment is that at least one PEF electrode represents a region of the otherwise electrically insulating wall (for example consisting of plastic) and the measuring dot is located on the outer face of the PEF electrode. Thus the advantage of a particularly simple and cost-effective construction is achieved. In other words, an outer face of at least one PEF electrode is visible to the IR sensor from the outside and the measuring dot is located on this outer face. In other words, the IR sensor looks from the outside at a PEF electrode. At least the PEF electrode providing the measuring dot on its outer face is thereby immovably arranged on the cooking product container.

One embodiment is that at least one PEF electrode is movably arranged in the cooking product container, and a surface of the wall located behind the movable PEF electrode (i.e. opposing the side remote from the cooking product) has at least one electrically conductive insert which is surrounded by electrically insulating material, which is contacted by the liquid on the inner face when the cooking product container is full, and which is located on the outer face in the measuring dot of the IR sensor. By the mobility of the at least one PEF electrode, the advantage is achieved that a distance between two opposing PEF electrodes may be set in a targeted manner. As a result, in turn an impedance may be adapted to a performance of the pulse generator. In this embodiment, a wall consisting of electrically insulating material, for example plastic, is located behind a movable PEF electrode. In this case, the IR sensor is not able to "look" at the PEF electrode. A detection of the temperature on the outer face of a wall which is electrically insulated over the entire surface area is disadvantageous since a high temperature gradient is present in such a wall, which prevents a reliable measurement of the temperature of the liquid on the inner face of the wall. In particular, rapid temperature changes are not able to be detected. By means of the electrically conductive insert or insert element (also able to be denoted as the "inlay"), which contacts the liquid in the cooking product container on the inner face but does not serve as a PEF electrode, accordingly a reliable and rapidly reacting temperature detection is made possible, even in the case of a movable PEF electrode.

The insert serves exclusively as a support for a measuring dot for detecting the temperature of the liquid by means of the at least one IR sensor. The size of said insert may thus be limited to the size of the measuring dot or be even smaller than the measuring dot. The smaller the insert or the surface thereof on the inner face, advantageously the lower an influence of an electrical field inside the cooking product container. In particular, the outer face of the insert corresponds to the measuring dot or is only slightly larger or smaller.

One development is that the insert is a metal plate, for example a metal sheet. This metal plate may be injection-molded, for example, into the surrounding electrically insulating material on the edge side. Thus the metal plate only has to be the size of the measuring dot.

The insert is as thin as possible in order to avoid thermal inertia.

One embodiment is that a distance of the IR sensor is at least 1 cm from the PEF electrodes and/or from the insert. A flash-over of high voltage onto the IR sensor is prevented in a particularly reliable manner by means of such an air gap.

One embodiment is that that an optical axis of the IR sensor stands perpendicularly to a surface of the electrically conductive region located in the measuring dot of the IR sensor. In other words, the IR sensor "looks" perpendicularly onto the measuring dot. This arrangement permits a particularly reliable temperature measurement.

One embodiment is that that the household PEF cooking device has a plurality of IR sensors, the measuring dots thereof being arranged one on top of the other. As a result, the advantage is achieved that a current level (also denoted as the level height or water level) in the cooking product container may be at least approximately determined. For example, in particular during an initial heating-up phase, the control device may be designed to monitor whether the temperature detected on the different measuring dots or by the different IR sensors increases sufficiently within a predetermined time period (for example a temperature difference within the predetermined time period is higher than a predetermined threshold value). In the measuring dots for which this is the case, it may be assumed that they are submerged at least significantly into the liquid on the inner face and thus the liquid extends as far as the highest such measuring dot. Analogously, it may be concluded that the liquid does not reach as far as a measuring dot where there is insufficiently rapid heating. The control device may use the knowledge about the level, for example, to form the PEF signals or to adapt an energy input into the cooking product container.

The measuring dots may be present, for example, one on top of the other on an outer face of the same PEF electrode. The measuring dots may be located particularly advantageously on the surfaces of inserts or inlays respectively arranged separately one on top of the other on the outer face, since in this manner a cross influence of the temperature between the regions bearing the measuring dots is particularly small.

By such an arrangement of measuring dots arranged one on top of the other, an identification of foaming and/or an identification of boiling over may also be implemented: if during the course of a cooking process it is identified that a temperature of a measuring dot which is initially located above the level significantly increases, or significantly increases within a predetermined time period (for example suddenly increases), it may be assumed therefrom that the associated wall region is now wetted on the inner face with liquid. A foam formation and/or a boiling over of the liquid may be identified therefrom. The control device may then reduce, for example, an energy input into the cooking product container.

One embodiment is that that the household PEF cooking device has an IR sensor which is vertically movable—in particular by motor—and is designed to move the IR sensor during a cooking process to different vertical positions which correspond to measuring dots arranged vertically one on top of the other. By detecting or measuring the temperature applied to the measuring dots arranged one on top of the other chronologically in succession, a similar functionality may be provided in an even more cost-effective manner relative to the above-described arrangement with a plurality of IR sensors, the measuring dots thereof being arranged one on top of the other.

One embodiment is that that the electrically conductive region of the wall, which is located in the field of view of the IR sensor, is provided on its outer face with a coating which has a high spectral emissivity. This increases a reliability or accuracy of a temperature determination. This is based on the consideration that metal, at least in bare or cleaned or polished form, has only a low emissivity, but an emissivity over the temperature range to be monitored (in cooking processes typically from approximately 0° C. up to approximately 100° C.) has to be as uniform and as high as possible.

One embodiment is that that the IR sensor (i.e. the IR sensor as such or the housing thereof) is grounded with low resistance. This may be implemented, for example, by the IR sensor being connected to a ground wire of an electronics system which operates said IR sensor.

One embodiment is that that the IR sensor is connected to the control device via a galvanically isolating interface. Thus interference or interference signals which may occur due to influence phenomena (for example voltages generated by field-induced charge displacements) may be avoided. An example of a galvanically isolating interface is the I²C bus interface, which is able to be implemented, for example, by means of integrated structural elements of the type ADuM2250 or ADuM2251 manufactured by Analog Devices.

BRIEF DESCRIPTION OF THE DRAWINGS

The above-described properties, features and advantages of this invention and the manner in which they are achieved will become clearer and more clearly comprehensible in connection with the following schematic description of an exemplary embodiment which is described in more detail in connection with the drawings.

DETAILED DESCRIPTION OF EXEMPLARY EMBODIMENTS OF THE PRESENT INVENTION

Figure 1:
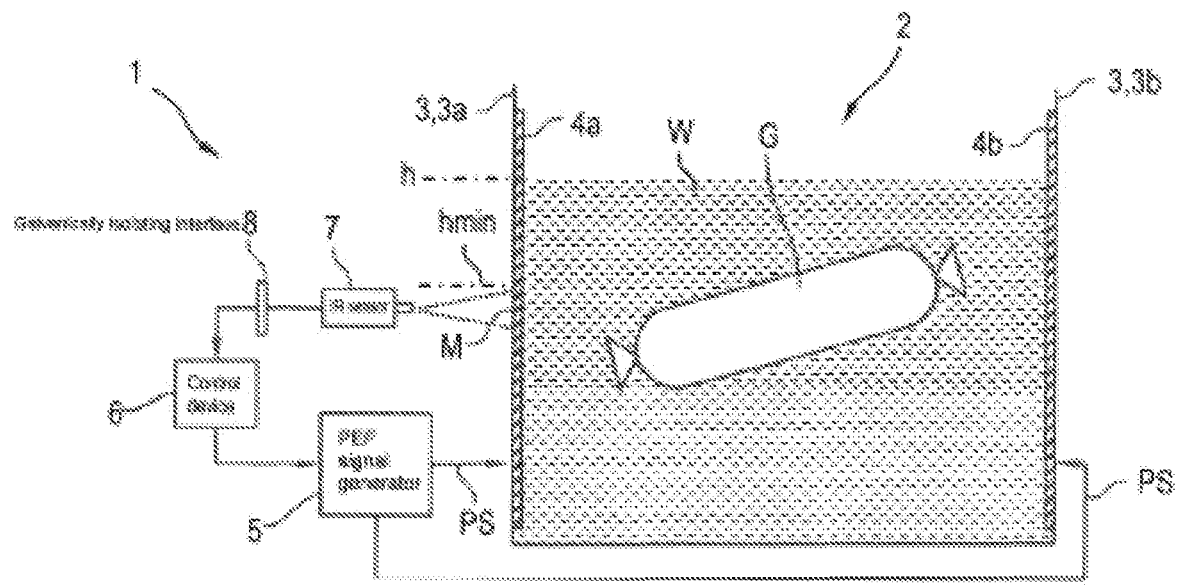
FIG. 1 shows as a sectional drawing in side view a simplified sketch of a PEF cooking device according to a first exemplary embodiment with a cooking product container and an IR sensor.

FIG. 1 shows as a sectional drawing in side view a simplified sketch of a PEF cooking device 1. The PEF cooking device 1 has a cooking product container 2 with, for example, a rectangular wall 3. A first metal PEF electrode 4a and a second metal PEF electrode 4b are arranged on two opposing wall sections (in this case a left-hand side wall 3a and a right-hand side wall 3b). The PEF electrodes 4a and 4b are configured to be plate-shaped and are oriented vertically and parallel to one another. The PEF electrodes 4a, 4b in this case represent wall regions of the wall 3 and are exposed on the inner face and outer face.

Pulsed PEF high-voltage signals PS are able to be applied in a manner known in principle onto the PEF electrodes 4a, 4b by means of a PEF signal generator 5. The cooking product container 2 can be filled with water W and cooking product G (here, for example, in the form of a sausage), wherein in this case it should be filled at least up to a minimum (target) level hmin. The water W or the cooking product 2 contacts the PEF electrodes 4a, 4b which are exposed on the inner face.

The PEF signal generator 5 is able to be controlled via a control device 6 in a manner known in principle so that, for example, an energy input into the water W and the cooking product G may be adapted thereby, for example by changing a frequency of the PEF signals PS.

The PEF cooking device 1 also has an IR sensor 7 which measures the temperature contactlessly, which is arranged on the outer face of the container 2 and which is connected to the control device 6 via a galvanically isolating interface 8. As a result, the measurement signals generated by the IR sensor 7, or further processed, for example digital, measurement data, may be used by the control device 6 to adapt the energy input into the water W and the cooking product G and/or to trigger a further action. The IR sensor 7 is grounded with low resistance.

The IR sensor 7 in this case is oriented perpendicularly to the outer face of the PEF electrode 4a (the optical axis thereof is thus perpendicular to the outer surface of the first PEF electrode 4a) and at the same time removed at least 1 cm from the surface. The first PEF electrode 4a is thus located in the field of view of the IR sensor 7 on an outer face. The measuring dot which is present on the outer surface of the first PEF electrode 4a, which corresponds at that point to a surface area of the viewing region, in this case is arranged entirely on the first PEF electrode 4a.

In particular, the measuring dot is located below the minimum (target) level hmin and thus in a region of the first PEF electrode 4a which, when the cooking product container 2 is correctly filled, is in contact with the water W and/or the cooking product G on the inner face. The control device 6 thus may also be designed to identify whether the cooking product container 2 is sufficiently filled to perform a cooking process (i.e. for cooking or heating the cooking product G). This may be implemented, for example, by the control device 6 identifying whether, after the PEF signals PS have been applied, the temperature detected by means of the IR sensor 7 has reached or exceeded a predetermined threshold value, or in the case of a current level h<hmin which is too low, does not reach or exceed said predetermined threshold value, optionally within a predetermined time period. Advantageously, the minimum level corresponds at least approximately to the upper edge of the measuring dot M.

Figure 2:
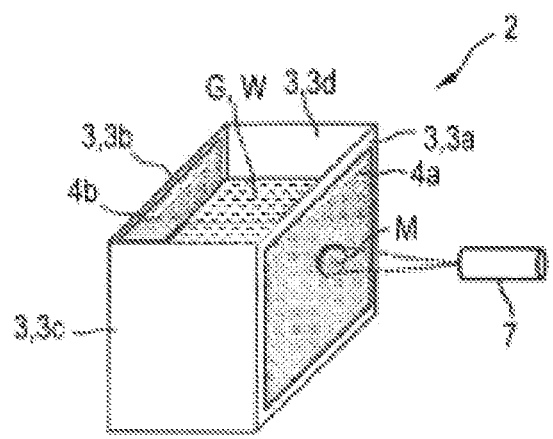
FIG. 2 shows in an oblique view a sketch of the cooking product container and the IR sensor of the PEF cooking device according to the first exemplary embodiment with the IR sensor.

FIG. 2 shows a sketch of the cooking product container 2 and the IR sensor 7 in oblique view. The wall 3 outside the PEF electrodes 4a, 4b and thus also the front and rear side walls 3c, 3d and the bottom are made of electrically non-conductive material such as plastic, ceramic, etc. and thus insulate the PEF electrodes 4a, 4b from one another.

Figure 3:
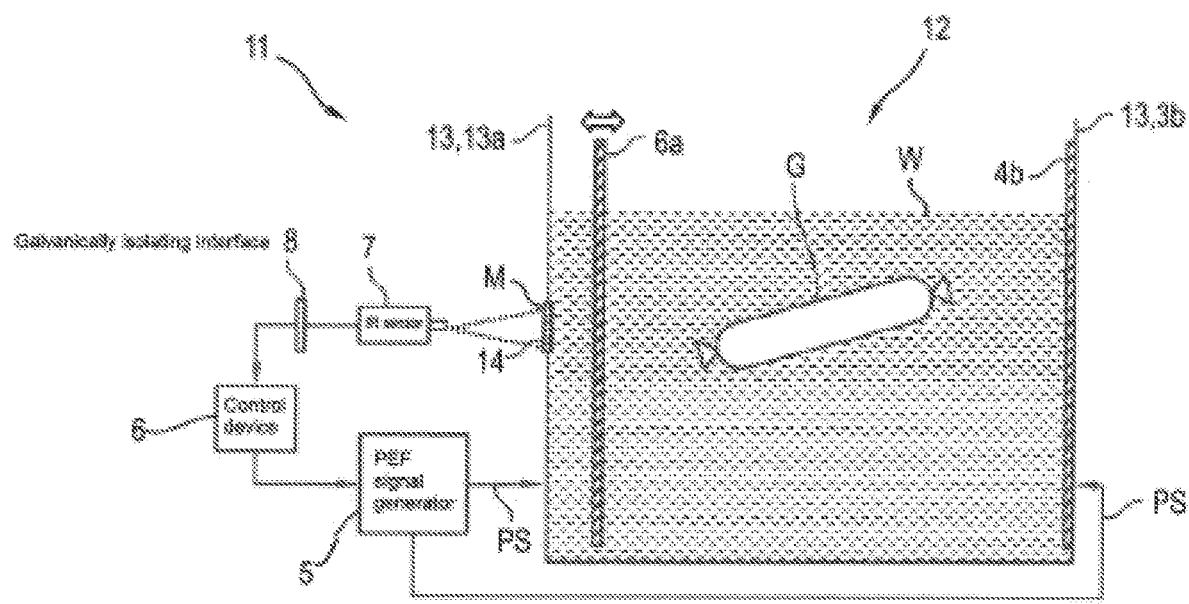
FIG. 3 shows as a sectional drawing in side view a simplified sketch of a PEF cooking device according to a second exemplary embodiment with a cooking product container and an IR sensor.

FIG. 3 shows as a sectional drawing in side view a simplified sketch of a PEF cooking device 11 with a cooking product container 12 and the IR sensor 7. The cooking product container 12 differs from the cooking product container 2 by the first PEF electrode 6a now being arranged so as to be frontally displaceable within the wall 13, as indicated by the double arrow. As a result a distance between the two PEF electrodes 6a, 4b may be set, for example manually or by motor, via the control device 6. The first PEF electrode 6a thus no longer represents a wall region.

Rather, in this case the left-hand wall side 13a which is located behind the first PEF electrode 6a, consists substantially over the entire surface area of electrically insulating material such as plastic, etc., i.e. over the entire surface area except for a metal sheet 14 inserted into the left-hand wall side 13a. The metal sheet 14 contacts the water W on the inner face and is visible on the outer face to the IR sensor 7. The measuring dot M of the IR sensor 7 is advantageously located entirely on the metal sheet. To avoid a significant influence of the electrical field present inside the cooking product container 12 when the PEF signals PS are applied, the metal sheet 14 advantageously has a surface area which corresponds to the measuring dot M or is only slightly larger.

Figure 4:
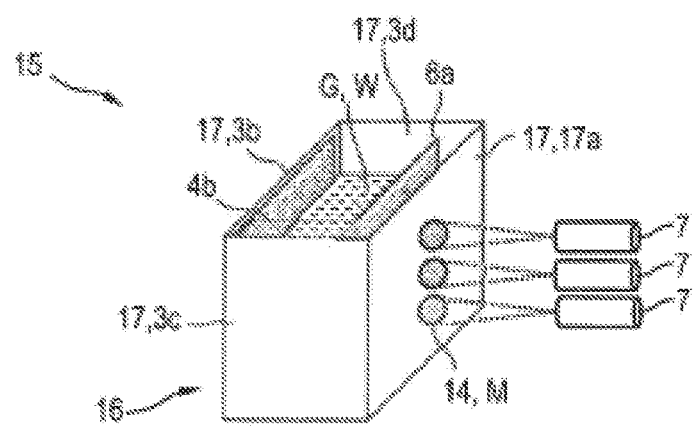
FIG. 4 shows as a sectional drawing in side view a simplified sketch of a PEF cooking device according to a third exemplary embodiment with a cooking product container and a plurality of IR sensors.

FIG. 4 shows as a sectional drawing in side view a simplified sketch of a PEF cooking device 15 of which only the cooking product container 16 thereof and a plurality of IR sensors 7, which are arranged vertically one on top of the other, are illustrated (in this case by way of example three). The IR sensors 7 are connected to the control device 6 in a manner similar to the PEF cooking devices 1 and 11.

The PEF cooking device 15 represents a modification of the PEF cooking device 11 such that the cooking product container 16 has, for example, on a wall side 17a of the wall 17 three inserts in the form of metal sheets 14 arranged one on top of the other in an arrangement similar to the IR sensors 7. As a result, it is advantageously possible, for example, to determine the current level h at least approximately, to identify a foam formation and/or a boiling over, etc.

In an alternative, functionally analogous development, only one IR sensor 7 needs to be present, said IR sensor, for example, being controlled by motor by means of the control device 6, being vertically movable and thereby being able to measure the temperatures applied to the plurality of metal sheets 14 in succession.

Naturally, the present invention is not limited to the exemplary embodiment shown.

Thus the outer faces of the PEF electrode 4a and/or the metal sheet 14 may have a coating which is located at least in the field of view of the IR sensor 7 and which has a high spectral emissivity.

Generally "a", "one", etc. may be understood to mean a singular or a plurality, in particular in the sense of "at least one" or "one or more", etc., provided this is not explicitly excluded, for example by the expression "just one", etc.

A given number may also encompass the specified number and a conventional tolerance range, provided this is not explicitly excluded.

The invention claimed is:

1. A household PEF cooking device, comprising:
a cooking product container fillable with liquid and comprising PEF electrodes which lie opposite one another and configured to receive a cooking product that is located between the PEF electrodes;
a PEF signal generator configured to apply PEF signals to the PEF electrodes;
a control device configured to control the PEF signal generator; and
an IR sensor configured to measure contactlessly, said IR sensor being disposed at a distance from the PEF electrodes and connected to the control device, wherein a measuring dot of the IR sensor encompasses an outer face of an electrically conductive region of a wall of the cooking product container, which electrically conductive region is capable of being contacted on an inner face by the liquid when the cooking product container is full.

2. The household PEF cooking device of claim 1, wherein the wall of the cooking product container outside of the PEF electrodes is made of electrically insulating material, at least one of the PEF electrodes representing a region of the wall, with the measuring dot of the IR sensor located on the at least one of the PEF electrodes.

3. The household PEF cooking device of claim 2, wherein the IR sensor has an optical axis which stands perpendicularly to a surface of the electrically conductive region located in the measuring dot of the IR sensor.

4. The household PEF cooking device of claim 1, wherein at least one of the PEF electrodes is movably arranged in the cooking product container, said wall of the cooking product container outside of the PEF electrodes being made of electrically insulating material and including a surface behind the at least one of the PEF electrodes, and further comprising an electrically conductive insert inserted in the surface of the wall and surrounded by the electrically insulating material, said insert capable of being contacted by the liquid on an inner face thereof and located on an outer face thereof at least partially in the measuring dot of the IR sensor.

5. The household PEF cooking device of claim 4, wherein the IR sensor is spaced from the insert at a distance of at least 1 cm.

6. The household PEF cooking device of claim 4, further comprising a plurality of said IR sensors, with the measuring dots of the IR sensors being arranged on top of one another.

7. The household PEF cooking device of claim 6, wherein each of the plurality of the IR sensor has an optical axis which stands perpendicularly to a surface of the electrically conductive region located in the measuring dot of the IR sensor.

8. The household PEF cooking device of claim 4, wherein the IR sensor is vertically movable for movement to different vertical positions which correspond to measuring dots arranged vertically one on top of one another.

9. The household PEF cooking device of claim 4, wherein a surface area of an outer surface of the electrically conductive insert is equal to a surface area of the measuring dot.

10. The household PEF cooking device of claim 4, wherein the IR sensor has an optical axis which stands perpendicularly to a surface of the electrically conductive region located in the measuring dot of the IR sensor.

11. The household PEF cooking device of claim 4, wherein the IR sensor is configured to measure a temperature of the measuring dot.

12. The household PEF cooking device of claim 1, wherein the IR sensor is spaced from the PEF electrodes at a distance of at least 1 cm.

13. The household PEF cooking device of claim 1, wherein the IR sensor has an optical axis which stands perpendicularly to a surface of the electrically conductive region located in the measuring dot of the IR sensor.

14. The household PEF cooking device of claim 1, further comprising a plurality of said IR sensors, with the measuring dots of the IR sensors being arranged on top of one another.

15. The household PEF cooking device of claim 1, wherein the IR sensor is vertically movable for movement to different vertical positions which correspond to measuring dots arranged vertically one on top of one another.

16. The household PEF cooking device of claim 1, wherein the outer face of the electrically conductive region of the wall, which electrically conductive region is located in the measuring dot of the IR sensor, is provided with a coating of high spectral emissivity.

17. The household PEF cooking device of claim 1, wherein the IR sensor is grounded with low resistance.

18. The household PEF cooking device of claim 1, further comprising a galvanically isolating interface via which the IR sensor is connected to the control device.

19. The household PEF cooking device of claim 1, wherein a surface area of an outer surface of the electrically conductive region is equal to a surface area of the measuring dot.

20. The household PEF cooking device of claim 1, wherein the IR sensor is configured to measure a temperature of the measuring dot.

* * * * *